US005779220A

United States Patent [19]

Nehl et al.

[11] Patent Number: 5,779,220

[45] Date of Patent: Jul. 14, 1998

[54] LINEAR SOLENOID ACTUATOR FOR AN EXHAUST GAS RECIRCULATION VALVE

[75] Inventors: Thomas Wolfgang Nehl, Shelby Township, Mich.; Noreen Louise Mastro, Rochester, N.Y.; Raul Armando Bircann, Penfield, N.Y.; Dwight Orman Palmer, Rochester, N.Y.

[73] Assignee: General Motors Corporation, Detroit, Mich.

[21] Appl. No.: 599,538

[22] Filed: Feb. 6, 1996

Related U.S. Application Data

[63] Continuation-in-part of Ser. No. 303,958, Sep. 9, 1994, abandoned.

[51] Int. Cl.$^6$ .................... F16K 31/06

[52] U.S. Cl. .................... 251/129.15; 335/297; 123/571

[58] Field of Search .................... 251/129.15; 123/571; 335/297

[56] References Cited

U.S. PATENT DOCUMENTS

| | | | |
|---|---|---|---|
| 2,629,007 | 2/1953 | Forman | 175/336 |
| 4,044,324 | 8/1977 | Coors | 335/260 |
| 4,250,922 | 2/1981 | Will et al. | 251/129.15 X |
| 4,919,390 | 4/1990 | Ichiryn et al. | 335/297 |
| 5,020,505 | 6/1991 | Grey et al. | 123/571 |
| 5,261,637 | 11/1993 | Curnow | 251/129.15 |

FOREIGN PATENT DOCUMENTS

| | | |
|---|---|---|
| 3309904 A1 | 9/1984 | Germany. |

*Primary Examiner*—Stephen M. Hepperle
*Attorney, Agent, or Firm*—Karl F. Barr, Jr.

[57] ABSTRACT

A valve assembly is disclosed for metering exhaust gas to the intake manifold of an internal combustion engine. The valve assembly has a base which includes a passage communicating between the intake manifold and the exhaust manifold of the engine. The passage has a valve seat which is operable with a valve member to meter the flow of exhaust gas through the passage to the intake manifold. An actuator assembly is mounted to the base and is operably connected to the valve member to move the valve member into and out of engagement with the valve seat. The actuator assembly includes a solenoid having a magnetic circuit comprising stationary primary and secondary pole pieces and a moveable armature. The primary pole piece includes an inner cylindrical wall operable to define, with the armature, a fixed radial gap for the passage of magnetic flux, and a tapered outer wall operable to increase the mass of the magnetic circuit, through which flux may pass, as the armature moves axially within cylindrical inner primary pole piece includes a n inwardly tapered, conical portion which operates, with an associated conical end of the moveable armature, to increase the axial opening force on the armature by establishing a secondary gap for the passage of magnetic flux as the armature approaches the conical tapered portion of the cylindrical wall. In addition, leakage flux is directed from said conical portion of said armature to said cylindrical inner wall across the entire range of motion of the armature to increase the axial force on said armature during operation of the valve.

2 Claims, 6 Drawing Sheets

LINEAR SOLENOID ACTUATOR FOR AN EXHAUST GAS RECIRCULATION VALVE

This is a continuation-in-part of Ser. No. 08/303,958 filed on Sep. 9, 1994, now abandoned.

TECHNICAL FIELD

The invention relates to a valve assembly for metering exhaust gas to the intake of an internal combustion engine and, particularly, to such a valve assembly having an improved linear solenoid actuator.

BACKGROUND

Exhaust gas recirculation (EGR) valves are employed in connection with internal combustion engines to aid in the lowering of regulated emissions and to enhance fuel economy by metering exhaust gas to the intake manifold for delivery to the combustion chamber. In the exhaust gas recirculation valve assembly set forth in U.S. Pat. 5,020,505 issued Jun. 4, 1991, to Grey et al., a base assembly contains a valve member in engagement with a valve seat. The base supports an actuator assembly including a linear, electromagnetic solenoid actuator which is operable to move the valve member relative to the valve seat to regulate the flow of exhaust gas therethrough.

The linear actuator includes primary and secondary pole pieces which cooperate to define an axially extending chamber in which is disposed a moveable armature. The armature includes a cylindrical member which moves, upon energization of the actuator, in the direction of the primary pole piece. The primary pole piece includes a substantially cylindrical center pole member with inner and outer walls defining a closed and an open end. The inner wall is substantially cylindrical and facilitates axial movement of the similarly configured armature, relative to the pole. As the armature moves in the direction of the closed end, a fixed, radial air gap is defined between the outer cylindrical wall of the armature and the inner cylindrical wall of the cylindrical center pole. Such a fixed air gap provides substantial controllability to the operation of the actuator. To provide a linear function to the operation of the actuator, the outer cylindrical wall of the cylindrical center pole is tapered outwardly, in the direction of the closed end thereof, such that as the armature moves in the direction of the closed end of the center pole, generally the opening direction of the solenoid operated valve, the mass of the pole piece through which the magnetic flux is forced to pass increases, so as to control the rate of magnetic saturation necessary to provide the desired linear displacement versus current characteristic.

The configuration results a peak force intermediate of the ends of armature travel, which diminishes as the armature continues to move towards its maximum axial travel. Such a reduction in opening force as the armature, and associated valve, approaches a fully opened position requires an increase in current to avoid a reduction in performance due to a loss of linear performance of the actuator.

SUMMARY OF THE INVENTION

The present invention is directed to an improved exhaust gas recirculation (EGR) valve for use with an internal combustion engine. It is an object of the present invention to address the reduction in opening force produced by the linear actuator as the armature moves the valve towards a fully opened position. Force reduction is minimized by providing a novel, primary pole piece having a cup shaped body with a substantially cylindrical center pole member. The pole member includes an inner wall which defines an axially extending chamber configured to receive, for axial travel therein, an associated armature. The cylindrical, center pole member of the primary pole piece also includes an outer wall having a taper which gradually increases the wall thickness in the direction of the closed end of the pole piece. As the armature moves in the direction of the closed end of the cup shaped pole piece the mass of the pole piece through which magnetic flux may pass is increased thereby providing a linear function to the operation of the actuator. Adjacent the terminal end of the axial chamber of the center pole member, the cylindrical wall tapers axially inwardly, defining a semi-conical end. The conical end of the axial chamber cooperates with a similarly tapered end on the armature to establish a secondary air gap which is operable to provide additional opening force on the armature across its range of motion and, more importantly, as the armature nears its fully displaced location near the closed end of the axially extending chamber of the center pole member. As the armature moves within the axial chamber, leakage flux is directed from the wall defining the conical end of the taper to the cylindrical wall of the center pole member providing an additional force component in the axial direction. As the tapered end of the armature approaches the closed end of the axial chamber, leakage flux is directed across the secondary gap defined by the associated conical surfaces of the axial chamber and the armature to rapidly increase the force component in the axial direction and thereby compensate for the force reduction experienced in prior linear actuators.

Other objects and features of the invention will become apparent by reference to the following description and to the drawings.

DESCRIPTION OF THE PREFERRED EMBODIMENTS

Figure 1:
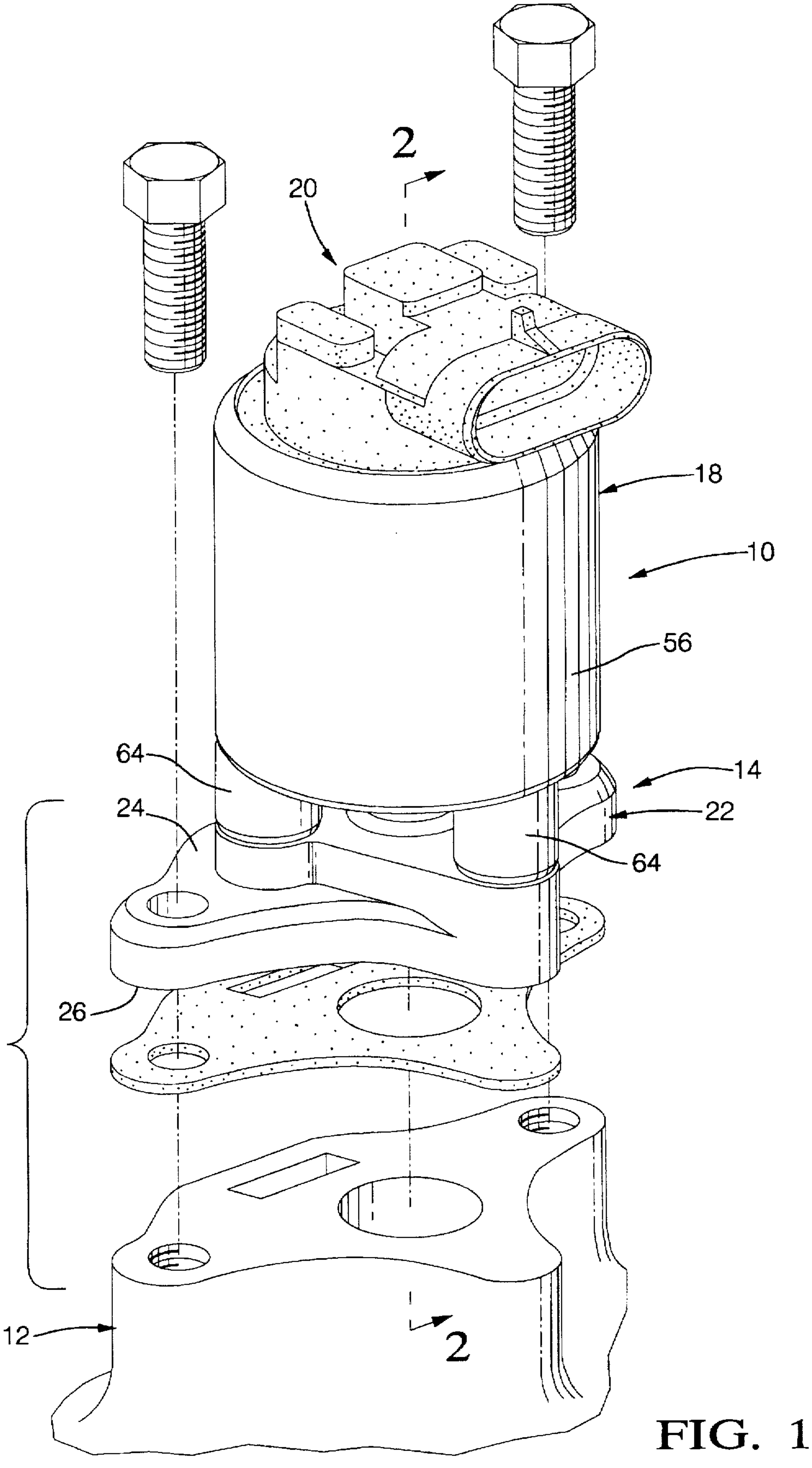
FIG. 1 is a partially expanded perspective view of an exhaust gas recirculation valve embodying features of the present invention.
Figure 2:
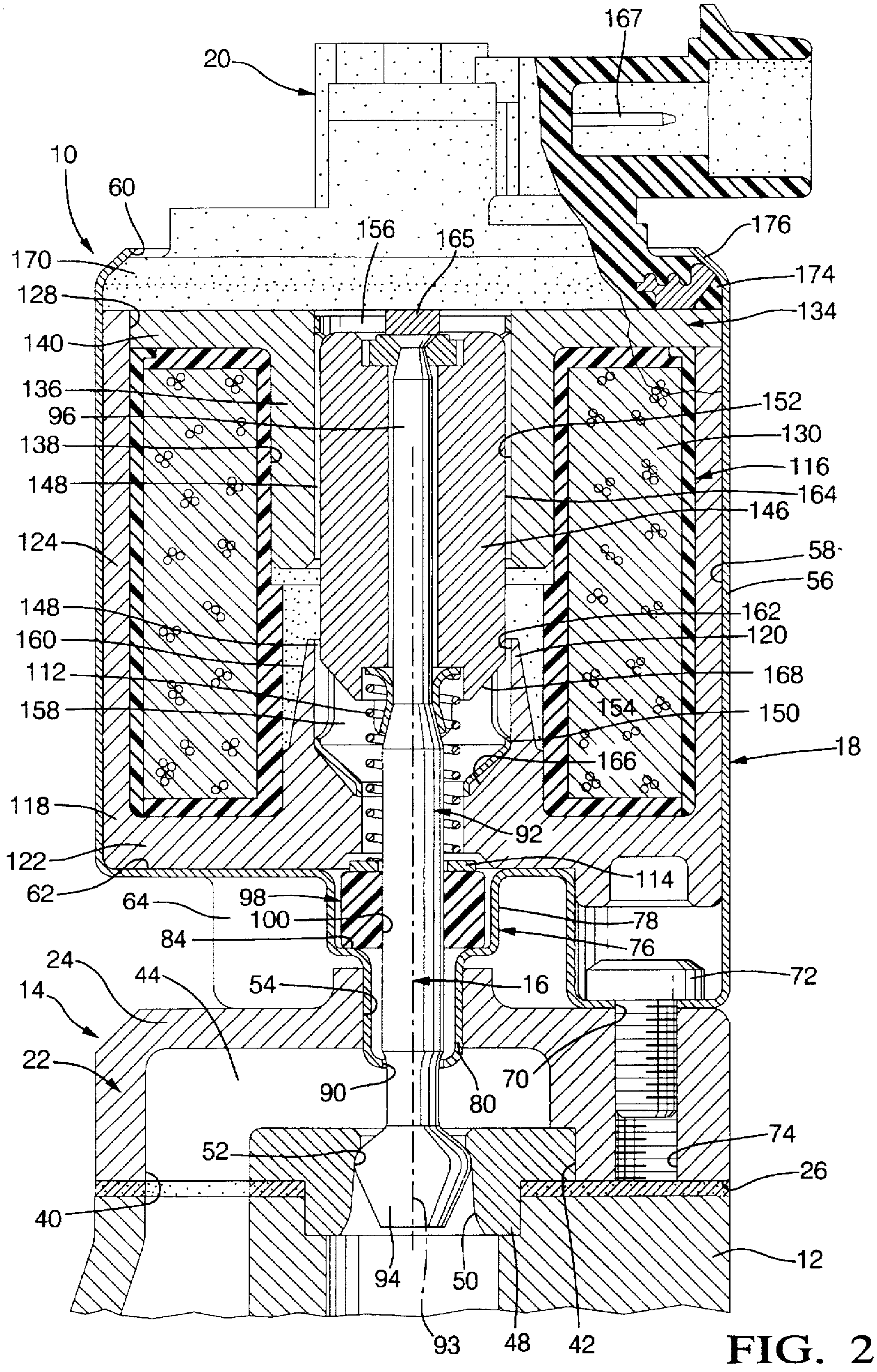
FIG. 2 is a partial, sectional view of the exhaust gas recirculation valve of FIG. 1 in a first mode of operation.

Referring first to FIGS. 1 and 2, an exhaust gas recirculation (EGR) valve, designated generally as 10, is shown for operation with an internal combustion engine 12. The EGR valve 10 comprises four principal subassemblies: the EGR base assembly 14, the valve assembly 16, the electromagnetic solenoid actuator assembly 18 and the pintle position sensor 20.

The EGR base assembly 14 includes a housing 22 for attachment to the engine 12. Located in the bottom 26 of housing 22 are openings 40 and 42 which are interconnected by passage 44. Opening 42 receives a valve seat insert 48 having an opening 50 surrounded by a valve seat 52. Located in the top 24 of the EGR housing 22 is valve stem opening 54, positioned coaxially with the opening 50 in the valve seat insert 48.

The actuator assembly 18 is carried in a housing 56. The housing 56 includes an upper cylindrical wall 58, as viewed in the Figures, defining an upper, open end 60 and a bottom or base 62. Extending downwardly from the bottom 62 of the housing 56 are one or more support members 64 which are included as part of the housing extrusion. The bottom of each support member 64 includes an opening 70 so that the support member 64 may accommodate attachment means such as bolts 72 which, when engaged with a corresponding threaded opening 74 in EGR base assembly 14, operate to retain the actuator housing 56 in rigid engagement therewith.

Also extending from the bottom 62 of the actuator housing 56 is a stepped extension 76 which comprises bearing housing 78 and valve stem passage 80. Both the bearing housing 78 and the valve stem passage 80 are integral with the actuator housing 56 and, in addition, occupy a coaxial, adjacent relationship to one another. The valve stem passage 80 includes an opening 90 for the passage of a valve stem 92.

The actuator housing 56 is assembled to the EGR base assembly 14 by alignment of the support members 64 with the threaded openings 74 in the housing 22 and insertion of the valve stem passage 80 into the valve stem opening 54 in the top 24. The valve stem passage 80 establishes an interference fit with the valve stem opening 54 to form a sealing interface between the actuator housing 56 and the EGR housing 22.

Valve assembly 16 comprises a poppet valve having an axially extending valve stem 92 with a valve head 94 at a first end. The second, distal end 96 of the valve stem 92 extends through the opening 50 in valve seat 48, and through the valve stem passage 80 and the bearing housing 78 to terminate at a location near the upper, open end 60 of the upper cylindrical wall 58 of the actuator housing 56. A valve stem bearing 98 is received in the bearing housing 78 and has an opening 100 through which the valve stem 92 passes. The opening 100 has a diameter which will support axial movement of the stem 92 in the bearing while minimizing leakage of exhaust gas at the interface thereof.

Radial clearance is established between the valve stem 92 and the opening 90 of the valve stem passage 80 and between the bearing 98 and the wall of the bearing housing 78, respectively. The bearing 98 is not fixed in position but is free to float, to a limited extent, utilizing the clearances to allow radial movement of the valve stem 92 occurring as a result of such factors as actuator variability or operation-caused wear. Lateral movement facilitated by the floating bearing allows the interface between the bearing opening 100 and the valve stem 92 to be of an extremely close tolerance, virtually eliminating gas leakage into the actuator assembly 18. In addition to the sealing interface established between the valve stem 92 and the bearing opening 100, a face seal is defined between the lower surface of the bearing member 98 and the shoulder 84 of the bearing housing. By placing the sealing surface normal to the direction of valve stem movement a rigid, or press fit is not required between the bearing 98 and the wall of the bearing housing 78 thereby permitting the utilization of radial clearance to accommodate lateral movement of the valve stem and bearing. In order to maintain leak-free sealing at the face seal, a biasing force is exerted on the bearing 98 by a biasing member such as compression spring 112.

Figure 3:
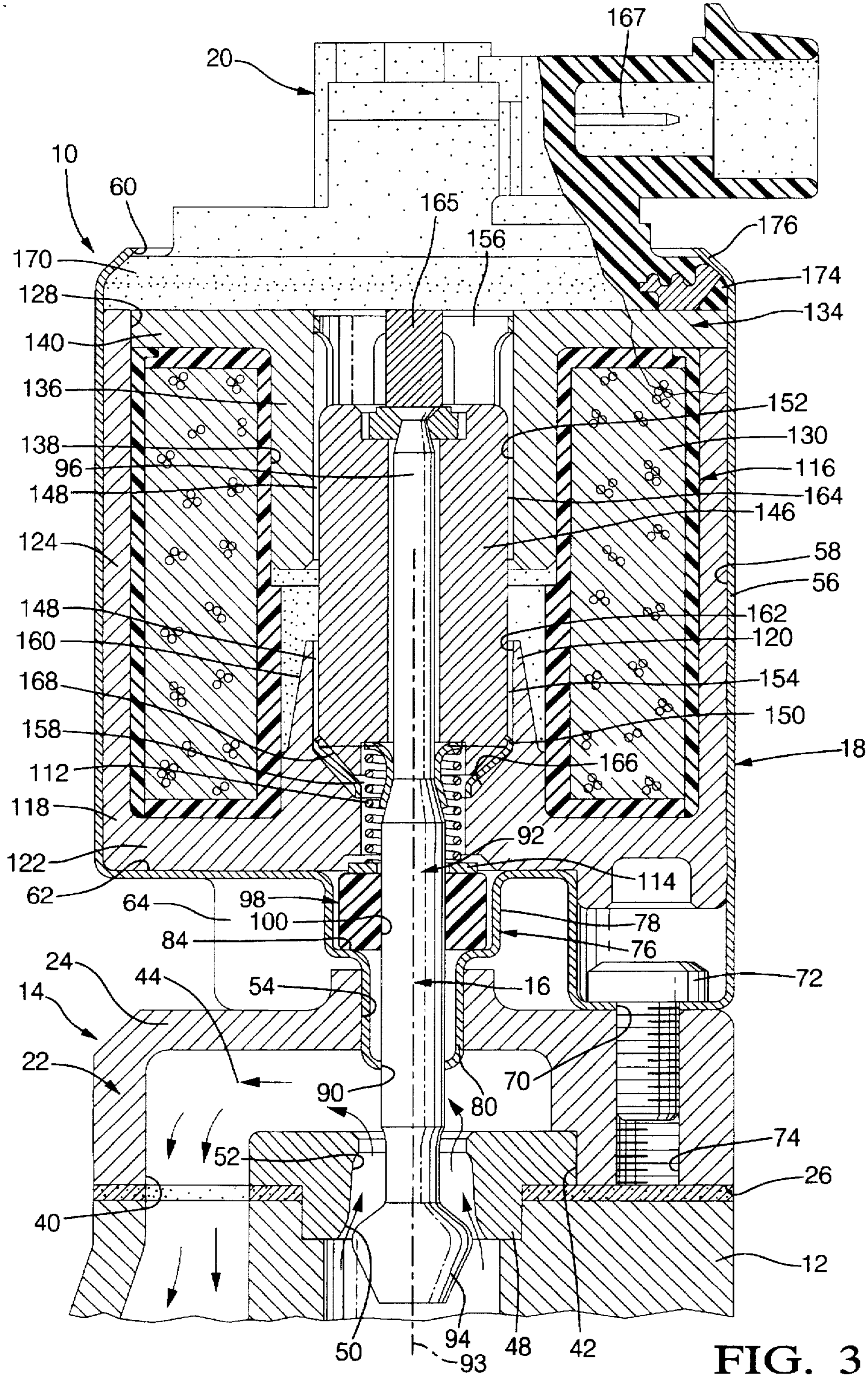
FIG. 3 is a partial, sectional view of the exhaust gas recirculation valve of FIG. 1 in a second mode of operation.
Figure 4:
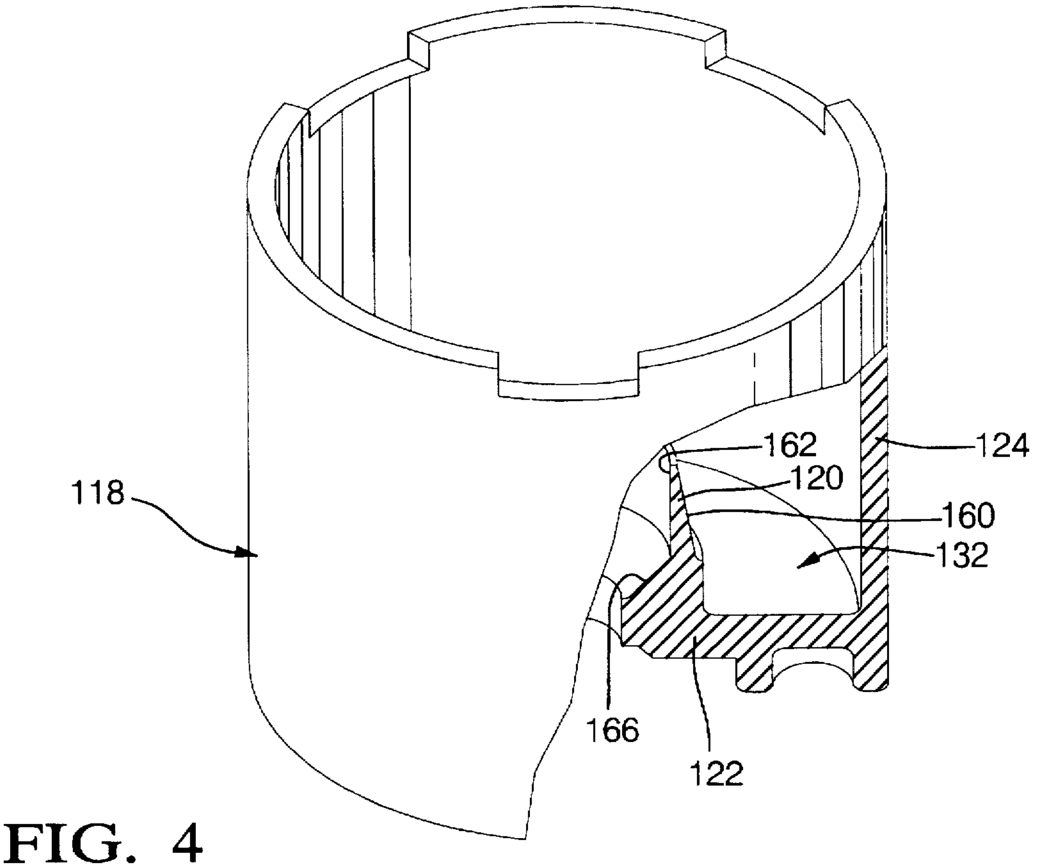
FIG. 4 is a perspective view, partially in section, of the primary pole piece of the actuator assembly for the exhaust gas recirculation valve of FIG. 1.

The actuator assembly 18 includes a linear solenoid 116 which is installed in the actuator housing 56 and is connected to the second, distal end 96 of the valve stem 92. The solenoid 116 is operable to move the valve stem 92 such that the valve head 94 is moved into and out of engagement with the valve seat 52 to initiate and regulate the flow of exhaust gas through the passage 44 in the EGR housing 22. As shown in FIGS. 2 and 3, a primary pole piece 118 has a cup shaped configuration with a substantially cylindrical center pole member 120, a base 122 and a cylindrical outer wall 124. The outer wall 124 is dimensioned to permit sliding insertion of the pole piece into the open end 60 of the actuator housing 56. The open end 128 of the cup-shaped primary pole piece 118 receives the annular coil/bobbin assembly 130 in space 132 formed between the upwardly projecting center pole member 120 and the outer wall 124.

Closure of the cup-shaped primary pole piece 118 is by a secondary pole piece 134 having a cylindrical center pole member 136 adapted for insertion within the axially extending, center opening 138 of the coil/bobbin assembly 130. The upper end of the secondary pole piece 134, as viewed in the Figures, includes a radially outwardly extending flange 140 for engagement with the circumference of the open end 128 of the wall 124 of primary pole piece 118. As thus far described, the magnetic circuit of the solenoid actuator 116 comprises primary pole piece 118, which establishes an extended magnetic circuit about a substantial portion of the coil 130, the secondary pole piece 134, and an armature 146 which is fixed to, and movable with, the second end 96 of the valve stem 92. The center pole member 120 of the primary pole piece 118 and the corresponding, center pole member 136 of the secondary pole piece 134 cooperate to define a cylindrical passage 152 having an axis which is substantially aligned with valve stem axis 93 and having a diameter which permits sliding axial movement of the armature 146, and the attached valve stem 32, therein.

Critical to the operation of the armature within the solenoid assembly is the maintenance of a circumferential, primary air gap 148 between the armature 146 and the center pole members 120,136. Establishment of the air gap 148 in the present EGR valve is through the use of a non-magnetic sleeve 150 which is positioned in the cylindrical passage 152 of the solenoid between the pole pieces and the armature. The sleeve 150 is constructed of a thin, non-magnetic material such as stainless steel or a temperature resistant polymer and has a series of slotted openings 154 which extend axially and provide communication between the captive air volume 156 above the armature 146 and the space 158 below the armature to minimize the effect of pneumatic damping on the movement of the armature.

In the linear solenoid actuator of the type contemplated herein, a linear relationship is desirable between force and current, over the entire range of armature, and hence, valve motion. To address the deficiencies inherent in prior linear EGR solenoid designs, the outer wall 160 of the cylindrical center pole member 120 is tapered outwardly from the actuator axis 93 in the direction of the closed end 122 of the primary pole piece 118 such that, as the armature 146 moves in the direction of the closed end 122, the mass of the pole piece through which the magnetic flux passes will increase, providing a desired linear displacement versus current characteristic. The tapered outer wall 160 of the center pole member 120 allows the inner wall 162 to remain substantially cylindrical defining the fixed, radial air gap 148 between the outer cylindrical wall 164 of the armature 146 and the inner cylindrical wall 162 of the cylindrical center pole 120. The fixed working air gap 148 provides substantial controllability to the operation of the actuator 18 since the force characteristics across the gap will not vary due to a changing gap dimension.

Adjacent the terminal end of the axial chamber 152, defined by the cylindrical center pole members 120 and 136, the wall 162 tapers axially inwardly, towards the center axis 93 of the actuator, to define a semi-conical chamber end 166. This conical chamber end 166, along with the cylindrical inner wall 162 of the center pole member 120 cooperates with a corresponding, similarly tapered end 168 formed on the armature 146 to thereby establish a secondary flux path which is operable to provide additional opening force on the armature 146, in the axial direction, across its full range of motion and, more importantly, as the armature nears its fully displaced location near the closed end terminal or bottom end of the axial chamber 156.

Figure 5:
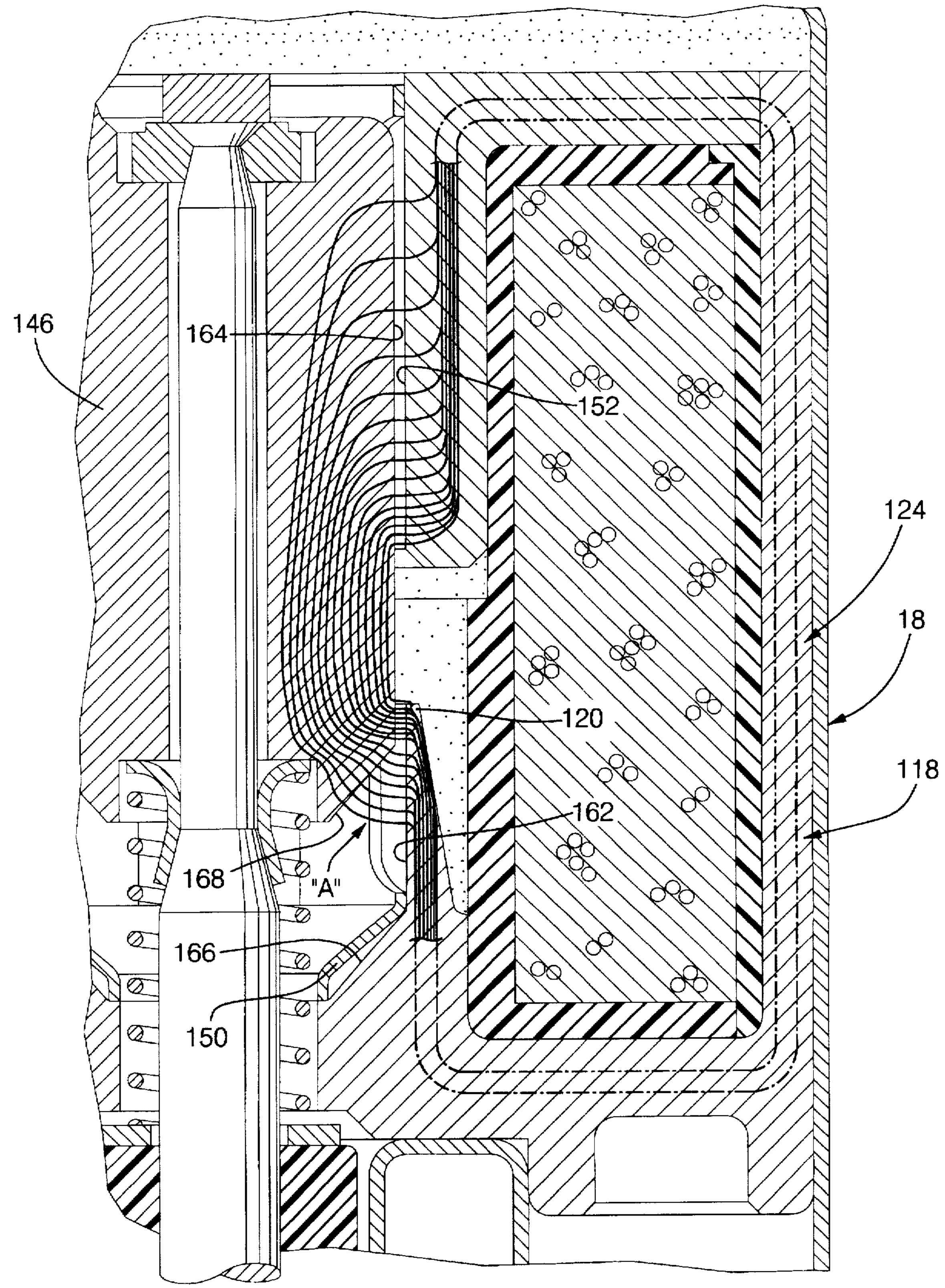
FIGS. 5 and 6 are partial, sectional views of the actuator assemblies of the exhaust gas recirculation valve of the present invention shown in different modes of operation.
Figure 6:
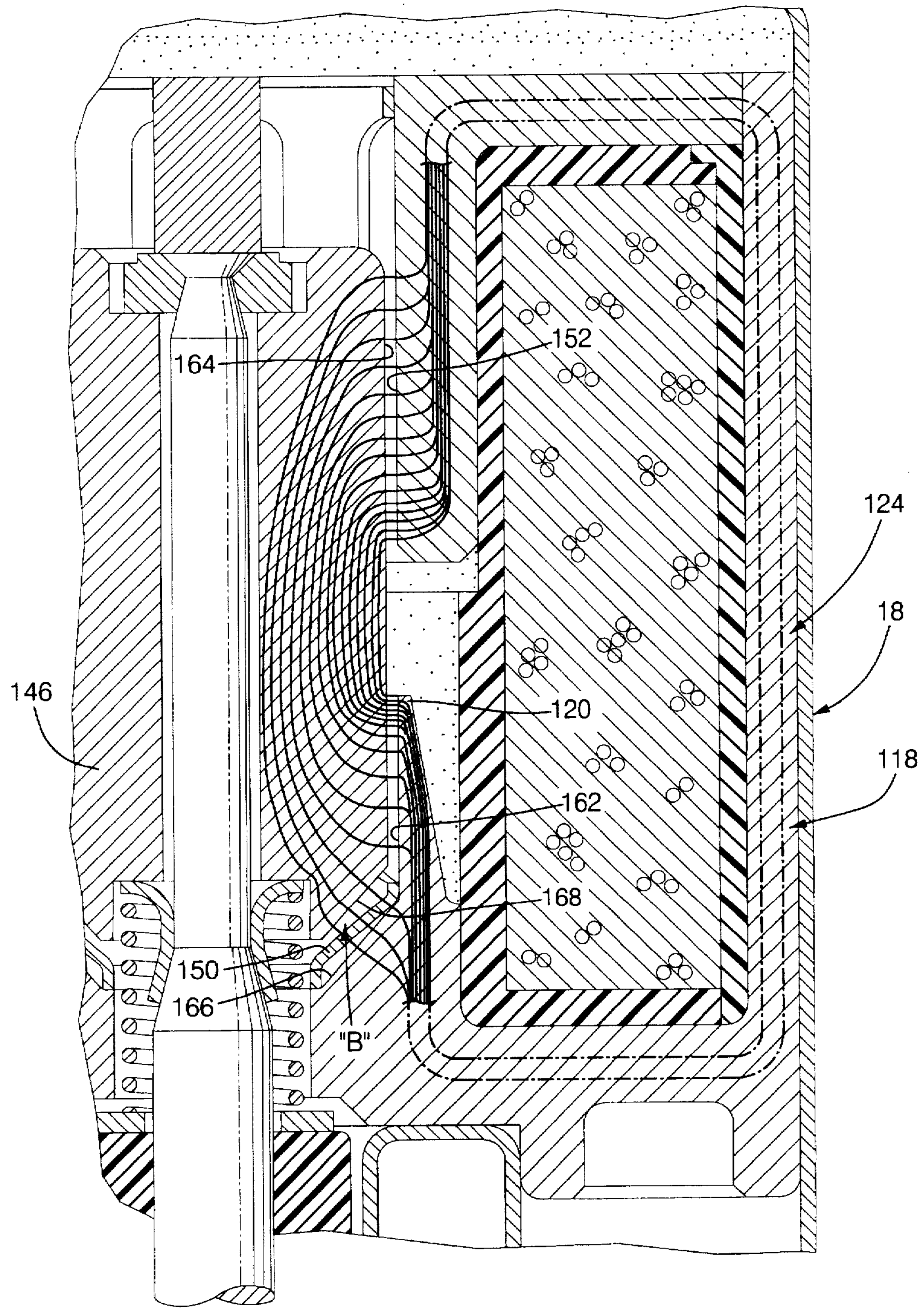

Specifically, as the armature 146 moves within the axial chamber 152, leakage flux "A", FIG. 5, is directed across the air gap defined by the conical armature end 168 and the cylindrical wall 162 of the center pole member 120 providing additional opening force in the axial direction. The additional opening force provided in this range of armature motion results in improved actuator response from a given current input. As the armature 146 approaches the closed end of the primary pole piece 118, corresponding to a fully opened valve position, flux "B", FIG. 6, is directed across the secondary gap defined by the associated conical surfaces 166 and 168 of the axial chamber 152 and the armature 146. Closure of the gap resulting from continued movement of the armature 146 in the valve opening direction, rapidly increases the magnetic force. The increase in force operates to compensate for the reduction in opening force experienced in prior linear actuators at the limits of actuator movement. As such, the tapered armature 146 and corresponding tapered wall portion 166 provide an additional degree of design freedom which is not available in typical solenoid actuators. The added design freedom results in higher axial forces acting on the armature in all positions.

Closing actuator assembly 18 is a pintle position sensor assembly 20. The pintle position sensor has a biased follower 165 which contacts the upper surface of the armature 146 and moves in concert with the valve shaft 92 to track its position and, as a result, the position of valve head 94 relative to seat 52. The position of the valve shaft 92 is translated into an electrical signal which is transmitted via the electrical connection 167 to an appropriate controller (not shown). The pintle position sensor 20 has a flange 170, extending about the perimeter thereof. The flange 170 of the sensor 20 is captured, along with an elastomeric seal 174 by the upper edge 176 of the open end 60 of the actuator housing 56 which is swaged over the flange 170.

The preferred operation of the EGR valve 10 shall now be described with reference to FIGS. 2 and 3. FIG. 2 shows the EGR valve in a closed position as might be encountered during a wide-open throttle setting when no exhaust gas is required to be recirculated to the engine intake. In the closed position, the coil 130 remains in a non-energized state and, as a result, no force creating magnetic flux fields are established. The spring 112 biases the armature 146 and attached valve assembly towards the closed position to thereby seat the valve member 94 against the valve seat 52. Upon a determination by an associated controller that engine operating conditions warrant the introduction of EGR to the intake manifold, a current signal is transmitted to the coil 130 via electrical connector 167 to establish a magnetic field across the radial air gap 148 between the outer cylindrical wall 164 of the armature 146 and the inner wall 152 of the center pole member 120 of the primary pole piece 118. In addition, as shown in FIG. 5, leakage flux "A" is directed across the air gap defined by the conical armature end 168 and the cylindrical wall 162 of the center pole member 120 providing additional opening force in the opening direction. The magnetic fields cause an opening force to be exerted on the armature 146 in the direction of the valve stem axis and opposing the bias exerted by the spring 112, and the differential pressure across the valve member 94, in the closing direction. As the force generated by the magnetic fields exceeds the spring bias and differential pressure load, the armature 146 and the attached valve assembly 16 moves axially such that the valve member is unseated from valve seat 52. As the valve opens, exhaust gas flows from the exhaust gas passage 178 through the passage 44 in the EGR base housing 22 to the intake passage 180. As the armature approaches the terminal end of the axial chamber 152, associated with a fully open valve position, flux "B", shown in FIG. 6, is directed across the secondary gap defined by the associated conical surfaces 168 and 166 of the axial chamber 152 and the armature 146. Closure of the gap resulting from continued movement of the armature 146 in the valve opening direction, rapidly increases the magnetic force.

The foregoing description of the preferred embodiment of the invention has been presented for the purpose of illustration and description. It is not intended to be exhaustive nor is intended to limit the invention to the precise form disclosed. It will be apparent to those skilled in the art that the disclosed embodiments may be modified in light of the above teachings. The embodiments described are chosen to provide an illustration of the principles of the invention and its practical application to thereby enable one of ordinary skill in the art to utilize the invention in various embodiments and with various modifications as are suited to the particular use contemplated. Therefore, the foregoing description is to be considered exemplary, rather than limiting, and the true scope of the invention is that described in the following claims.

We claim:

1. A valve assembly for metering exhaust gas to an internal combustion engine comprising an electromagnetic solenoid actuator having a magnetic circuit including primary and secondary pole pieces defining an axial chamber and an armature, associated with a valve member, and moveable in said chamber, said primary pole piece having a center pole member including a cylindrical inner wall, open at a first end, for receiving said moveable armature, said armature and said cylindrical inner wall defining a fixed, radially extending, primary air gap for flux passage thereacross, and an outer wall extending in an outward taper from said first, open end of said center pole member to a second end of said center pole member, said outwardly tapering wall operable to increase the mass of the pole piece through which said magnetic circuit operates as said armature moves from said first, open end of said center pole member towards said second end, said inner cylindrical wall further including an axially inwardly tapered, conical portion adjacent said second end of said center pole member, operable with an associated conical end portion of said moveable armature to define a secondary air gap for flux passage thereacross as said armature approaches said second end of said pole piece, and operable to increase axial force on said armature.

2. A valve assembly for metering exhaust gas to the intake of an internal combustion engine, as defined in claim 1, said conical end portion of said moveable armature operable with said cylindrical wall to define a passage for leakage flux as said armature moves in said axial chamber to further increase axial force on said armature.

* * * * *